: US 7,427,497 B2
(45) Date of Patent: *Sep. 23, 2008

(12) United States Patent
Dordick et al.

(54) IN VITRO METABOLIC ENGINEERING ON MICROSCALE DEVICES

(75) Inventors: Jonathan S. Dordick, Schenectady, NY (US); Aravind Srinivasan, Cambridge, MA (US); Jungbae Kim, Seoul (KR); David H. Sherman, Ann Arbor, MI (US); Douglas S. Clark, Orinda, CA (US)

(73) Assignees: Rensselaer Polytechnic Institute, Troy, MI (US); Darpa, Arlington, VA (US); The Regents of the University of California, Oakland, CA (US)

( * ) Notice: Subject to any disclaimer, the term of this patent is extended or adjusted under 35 U.S.C. 154(b) by 806 days.

This patent is subject to a terminal disclaimer.

(21) Appl. No.: 10/287,440

(22) Filed: Nov. 1, 2002

(65) Prior Publication Data

US 2004/0062687 A1    Apr. 1, 2004

Related U.S. Application Data

(60) Provisional application No. 60/336,045, filed on Nov. 1, 2001.

(51) Int. Cl.
C12N 11/18 (2006.01)
C12N 1/00 (2006.01)

(52) U.S. Cl. .................. 435/175; 435/176; 435/179; 435/181; 435/283.1; 435/289.1

(58) Field of Classification Search .................. None
See application file for complete search history.

(56) References Cited

U.S. PATENT DOCUMENTS

| | | | |
|---|---|---|---|
| 3,650,900 A | | 3/1972 | Levin et al. |
| 4,331,767 A | | 5/1982 | Nakajima et al. |
| 5,051,184 A | | 9/1991 | Taylor |
| 5,181,999 A | | 1/1993 | Wiktorowicz |
| 5,200,334 A | | 4/1993 | Dunn et al. |
| 5,474,915 A | | 12/1995 | Dordick et al. |
| 5,618,933 A | | 4/1997 | Dordick et al. |
| 5,622,819 A | | 4/1997 | Herman |
| 5,637,469 A | * | 6/1997 | Wilding et al. ............. 435/7.21 |
| 5,716,825 A | * | 2/1998 | Hancock et al. .......... 435/286.5 |
| 5,824,526 A | | 10/1998 | Avnir et al. |
| 5,854,030 A | | 12/1998 | Dordick et al. |
| 6,042,709 A | | 3/2000 | Parce et al. |
| 6,063,589 A | * | 5/2000 | Kellogg et al. ................ 435/24 |
| 6,261,813 B1 | | 7/2001 | Khmelnitsky et al. |
| 6,303,290 B1 | | 10/2001 | Liu et al. |
| 6,475,805 B1 | * | 11/2002 | Charm et al. ............... 436/514 |
| 6,582,969 B1 | * | 6/2003 | Wagner et al. ............. 436/518 |
| 7,172,682 B2 | * | 2/2007 | Dordick et al. ............. 204/450 |
| 2001/0055797 A1 | | 12/2001 | Conroy et al. |
| 2002/0020931 A1 | | 2/2002 | Stowell et al. |
| 2002/0028506 A1 | | 3/2002 | Ho et al. |
| 2002/0185184 A1 | | 12/2002 | O'Connor et al. |

FOREIGN PATENT DOCUMENTS

WO      WO 00/62051      10/2000

OTHER PUBLICATIONS

Arenkov, P., et al., "Protein microchips: Use for immunoassay and enzymatic reactions," *Anal. Biochem.*, 278: 123-131 (2000).
Cane, D.E., et al. "The parallel and convergent universes of polyketide synthases and nonribosomal peptide synthetases," *Chemisty & Biology*, 6(12): R319-R325 (1999).
Drott, J., et al. "Porous Silicon as the carrier matrix in microstructured enzyme reactors yielding high enzyme activities," *J. Micromech. Microeng.*, 7: 14-23 (1997).
Gill, I., et al., "Encapsulation of biologicals within silicate, siloxane, and hybrid sol-gel polymers: an efficient and generic approach," *J. Am. Chem. Soc.*, 120(34): 8587-8598 (1990).
Gill, I., et al., "Bioencapsulation within synthetic polymers (Part 1): sol-gel encapsulated biologicals," *TIBTECH*, 18: 282-296 (2000).
Hadd, A.G., et al., "Microchip device for performing enzyme assays," *Anal. Chem.*, 69:3407-3412 (1997).
Haswell, S.J., et al., "Chemical and biochemical microreactors," *Trends Anal.*, 19: 389-395 (2000).
Katz, L., "Manipulation of modular polyketide synthases," *Chem. Rev.*, 97: 2557-2575 (1997).
Khosla, C., "Harnessing the biosynthetic potential of modular polyketide synthases," *Chem. Rev.*, 97: 2577-2590 (1997).
Kim, Y., et al., "Stable sol-gel microstructured and microfluidic networks for protein patterning," *Biotechnology & Bioengineering*, 73(5): 331-337 (2001).
Kim, J., et al., "Protease-containing silicates as active antifouling materials," *Biotechnology Prog.*, 18(3): 551-555 (2002).
Laurell, T., et al. "Silicon wafer integrated enzyme reactors," *Biosensors & Bioelectronics*, 10(3/4):289-299 (1995).
Leadlay, P.F., "Combinatorial approaches to polyketide biosynthesis," *Curr. Op. Chem. Biol.*, 1:162-168 (1997).

(Continued)

*Primary Examiner*—David A Redding
(74) *Attorney, Agent, or Firm*—Hamilton, Brook, Smith & Reynolds, P.C.

(57) ABSTRACT

Disclosed herein is a microfluidics device that can be used to prepare natural products and their analogs. The device comprises the enzymes of a biosynthetic pathway immobilized thereon and a means for sequentially directing a starting material and each ensuing reaction product to the enzymes of the biosynthetic pathway in the order corresponding to the steps of the biosynthetic pathway. The device can thus be used to prepare the natural product using the natural starting material of the biosynthetic pathway or analogs of the natural product using an unnatural starting material. Alternatively, artificial pathways can be created by immobilizing an appropriate selection of enzymes on the device in an order whereby each subsequent enzyme can catalyze a reaction with the product of the prior enzyme. Novel chemical entities can be prepared from these artificial pathways.

13 Claims, No Drawings

OTHER PUBLICATIONS

Nagy, G., et al., "Amperometric microcell for enzyme activity measurements," *Anal Chem.*, 70: 2156-2162 (1998).

Novick, S.J., et al., "Investigating the effects of polymer chemistry on activity of biocatalytic plastic materials," *Biotechnology and Bioengineering*, 68(6): 665-671 (2000).

Novic, S.J., et al., "Preparation of active and stable biocatalytic hydrogels for use in selective transformations," *Chem. Mat.*, 10:955-958 (1998).

Park, C.B., et al., "Sol-gel encapsulated enzyme arrays for high-throughput screening of biocatalytic activity," *Biotechnology & Bioengineering*, 78(2): 229-235 (2002).

Sergeeva, M.V., et al., "Peptide synthesis using proteases dissolved in organic solvents," *Enzyme Microbial Technogy*, 20: 623-628 (1997).

Wang, P., et al., "Biocatalytic plastics as active and stable materials for biotransformations," *Nature: Biotechnology*, 15: 789-793 (1997).

* cited by examiner

IN VITRO METABOLIC ENGINEERING ON MICROSCALE DEVICES

RELATED APPLICATION

This application claims the benefit of U.S. Provisional Application No. 60/336,045, filed on Nov. 1, 2001, the entire teachings of which are incorporated herein by reference.

GOVERNMENT SUPPORT

The invention was supported, in whole or in part, by a grant from the Office of Naval Research and the National Institutes of Health. The Government has certain rights in the invention.

BACKGROUND OF THE INVENTION

Nature produces a huge number of structurally diverse chemical substances with varying and potent biological activities. By exploiting these biological activities, researchers have discovered many utilities for natural products, including, but not limited to, their use as therapeutic agents, pesticides and antibiotic agents.

After discovering that a natural product has a particular biological activity, it is often desirable to prepare analogs of the natural product in order to optimize its properties. Generally, this is accomplished by preparing the analogs from the natural product itself or by synthesizing the analogs directly from readily available starting materials. Unfortunately, natural products and their analogs are typically complex molecules requiring multi-step syntheses to prepare even small quantities of the compound. To develop such syntheses is usually laborious, costly, and time consuming.

SUMMARY OF THE INVENTION

Disclosed herein is a novel microscale, microfluidics device that can be used to prepare natural products and their analogs. The device comprises a solid support with the enzymes of a biosynthetic pathway immobilized thereon and a micro-directing element (e.g., channels or conduits) for sequentially directing a starting material, and each ensuing reaction product, to the enzymes of the biosynthetic pathway in the order corresponding to the steps of the biosynthetic pathway. The device can thus be used to prepare a natural product using the natural starting material of the biosynthetic pathway, or analogs of the natural product using an unnatural starting material. Alternatively, artificial pathways can be created by immobilizing an appropriate selection of enzymes on the device in an order whereby each subsequent enzyme can catalyze a reaction with the product of the prior enzyme. New chemical entities can be prepared from these artificial pathways. The invention is described in greater detail below.

One embodiment of the invention is an apparatus for conducting a plurality of microscale reactions. The apparatus includes a solid support comprising a first and a second reaction site. Each site comprises a distinct immobilized biocatalyst, and a micro-directing element to direct an intermediate composition from the first site to the second site.

Another embodiment of the invention is a method for conducting reactions at a plurality of reaction sites using the apparatus disclosed herein. The method includes the step of directing a substrate composition to the first reaction site under conditions suitable for reacting the substrate with the immobilized catalyst of the first site, thereby producing a first intermediate composition. The first intermediate composition is then directed to the second reaction site, and exposed to conditions suitable for reacting the first intermediate with the immobilized catalyst at the second site, thereby producing a second intermediate composition.

The advantages of the invention disclosed herein are numerous and significant. The invention provides a means of optimizing biosynthetic pathways in a modular fashion. Furthermore, it allows the intrinsic limits of a pathway to be determined free from the restrictions of cellular processes. A further advantage is that the complexity of a pathway can be reduced compared to cellular systems. Yet another advantage is that the sequence and number of steps in a pathway can be varied, leading to synthesis of novel products. Still another advantage is that catalysts can be combined in ways that would be difficult or impossible in a cellular pathway. Yet another advantage is that components not found in biological systems can be used, such as chemical catalysts, synthetic starting materials, and organic solvents. Another advantage is that products can be produced or substrates used that would be toxic in kind or amount to a cell, if produced or used in a cellular pathway.

DETAILED DESCRIPTION OF THE INVENTION

The invention generally is related to an apparatus and method for conducting stepwise microscale chemical syntheses of natural products and related compounds. The apparatus includes the enzymes of a natural biosynthetic pathway, arranged so that a starting material can be directed to each enzyme on the apparatus in the order that they occur in nature. Thus, using the starting material of the natural biosynthetic pathway, the natural product of the pathway can be produced using the apparatus (See Examples 1 and 2 in the Exemplification). The apparatus can also be used to prepare related products through a number of variations. For example, the enzymes on the apparatus can use starting materials that are not used in nature. Alternatively, micro-directing elements of the apparatus can be arranged to conduct the steps of the synthesis in a different order than the natural pathway, or to combine enzymes from different pathways or enzymes that are not associated with specific pathways, or even enzymes from different organisms. The apparatus can mix biosynthetic enzymes from other pathways, and can also include catalysts, such as chemical catalysts that are not part of any natural biosynthetic pathway. In a preferred embodiment, the apparatus uses microfluidics techniques to direct substrates, intermediates, products, reagents, solvents and the like among the reaction sites. "Microfluidics" means directing fluids on the microscale, typically using micro-directing elements incorporated into a solid support in combination with a motive force, typically generated by electroosmotic flow.

"Microscale" means that dimensions of significant features such as the micro-directing elements or the reaction sites are submillimeter. For example, the width and height of a channel or conduit are typically between 1-1000 micrometers, typically between 10 and 500 micrometers and more typically between 10 and 250 micrometers. A microscale apparatus can also be defined in terms of the combined volume of the reaction sites and micro-directing elements. Typically, this combined volume is less than 500 nanoliters, more commonly less than 250 nanoliters and often less than 100 nanoliters. Typically, the combined volume is greater than a nanoliter and more commonly greater than 10 nanoliters.

A solid support is a piece of solid material that incorporates reaction sites and other features of the apparatus. For example, a solid support can be a microscope slide with reaction sites and connecting channels etched into its surface.

A solid support can be made of many different materials, including glass, plastic, quartz, silicon, metal, and the like.

A reaction site is a location on the solid support where a chemical reaction can take place. A reaction site can be located at a conduit or channel used to transport fluid compositions including substrates, intermediates, and reagents. Alternatively, a reaction site is located in a reservoir, i.e., an enlarged volume relative to a channel or conduit to which a channel or conduit is connected.

Chemical reactions that can be carried out on the disclosed apparatus include reactions that chemically transform a substrate compound, or starting material, into an intermediate compound, or reaction product. An intermediate from on reaction can serve as a substrate for the next enzyme in the sequence. A substrate is a starting material for a catalyzed reaction, and is the molecule or molecules that are chemically transformed into the intermediate or product. Specific kinds of chemical reaction include, among others, condensation, acylation, dimerization, alkylation, rearrangement, transposition, decarbonylation, coupling, aromatization, epoxidation, disproportionation, hydrogenation, oxidation, reduction, substitution, isomerization, stereoisomerization, functional group conversion, functional group addition, elimination, bond cleavage, photolysis, photodimerization, cyclization, hydrolysis, polymerization, and the like.

A biocatalyst is a catalyst that has a biological origin. A catalyst is an agent that causes a chemical reaction to proceed more quickly, without being chemically modified itself. Thus, a single catalyst can speed up the chemical transformation of many substrate molecules. Biocatalysts include catalytic antibodies, enzymes, catalytic peptides and catalytic RNA molecules. As used herein, biocatalysts can also be selections from natural biocatalysts, for example, the smallest functional catalytic portion of a multi-enzyme complex can be used, instead of the entire complex. A biocatalyst, as used herein, includes intact cells, cell organs, and cell extracts that can catalyze reactions.

An immobilized biocatalyst is attached to a reaction site so that is fixed, i.e., it is generally not washed away by the fluids used by the invention. Furthermore, an immobilized biocatalyst is attached in a way that allows it to retain most of the function of its non-immobilized state, and is stabilized against loss of catalytic activity that could occur due to reaction conditions. For example, immobilized enzymes can often be used with organic solvents that would cause denaturation of non-immobilized enzymes.

Biocatalysts can be immobilized by encapsulation in or covalent attachment to a number of different materials. Suitable materials can be substituted or unsubstituted, and include, for example, a solgel, a hydrogel, collagen gel, a polysaccharide gel, or other polymers. A solgel, for example, is a tetramethoxyorthosilicate, a methyl-trimethoxyorthosilicate, a tetraalkoxyorthosilicate, or a trialkoxyorthosilicate. A hydrogel is, for example, a polyacrylamide, a polyacrylate, a sugar-substituted polyacrylate, or a polyvinyl alcohol. A polysaccharide gel is, for example, is an alginate, a dextran, a starch, a cellulose, a carrageenan, a poly(hyaluronic acid), a heparin, a guar, or an inulin. Other polymers include a polyvinylene, a poly (vinyl acetate), a poly(ethyl vinyl ether, a polyacrylate such as a polymethyl methacrylate, a polystyrene, a polyvinyl silicate, a polyurethane, a polyalkanoate, a poly(lactic acid), a poly(3-hydroxybutyrate), or substituted variations thereof.

In the case of covalent attachment, for example, an enzyme is first chemically modified by attaching it via a chemical bond to an immobilizing polymer. For example, an enzyme can be reacted with acrylamide, which contains an ethylenically unsaturated group. The enzyme can then be combined with a polymerization precursor that also contain ethylene groups, such as acrylate. By co-polymerizing the ethyleneic groups on the enzyme with the acrylate precursor, an acrylate polymer is formed wherein the enzyme is attached by one or more chemical bonds to the polymer. Also, by attaching it directly to the polymer, the enzyme can be located within the polymer as well as on the surface of the polymer, increasing the amount of enzyme that can be immobilized at a reaction site.

In the case of non-covalent encapsulation, for example, an enzyme can be combined with one of the immobilizing materials noted above. Alternatively, the enzyme is combined with a precursor of a material, such as glucose acrylate or a solgel precursor, and the mixture is reacted to form the material so that the enzyme is encapsulated as the precursor is polymerized. Alternatively, an additional step includes crosslinking the material to further restrict the enzyme to the material.

The details of immobilizing enzymes in sol-gels, hydrogels, and other materials are fully described in previously published work, including: Kim, Y; Park, C.; Clark, D. 2001 *Biotechnol Bioeng.*, 73, 331-337; Wang, P., Sergeeva, M. V., Lim, L., and Dordick, J. S. 1997, *Nat. Biotechnol.* 15: 789-793; Novick, S. J. and Dordick, J. S. 2000, *Biotechnol. Bioeng.* 68: 665-671; Sergeeva, M. V., Paradkar, V. M., and Dordick, J. S. 1997, *Enzyme Microb. Technol.* 20: 623-628; Novick, S. J. and Dordick, J. S. 1998, *Chem. Mat.* 10: 955-958; Kim, J., Deilo, R. and Dordick, J. S. 2002; *Biotechnol. Prog.* The entire teaching of the preceding works are incorporated herein by reference.

When the immobilizing polymer is a polyacrylate, for example its precursor monomer can be advantageously substituted with a sugar such as sucrose, lactose, mannose, an alkylmannoside, glucose, an alkylglucoside, galactose, an alkylgalactoside, fructose, an alkylfructoside, or trehalose. Immobilizing enzymes in combination with sugar molecules helps to maintain their normal catalytic activity. Referencing the above example, the polymerization precursor could be, for example, acrylate substituted with glucose.

As used herein, distinct catalysts are catalysts, including biocatalysts, which have different structures, different formulas or catalyze different reactions. For example, two enzymes that vary by a single amino acid in sequence are distinct. Also, enzymes that produce different products from the same substrate are distinct.

A "micro-directing element" is a physical feature such as a channel, a conduit, a chamber, and the like that can be used to transport substrates, intermediates, products, reagents, solvents, and the like from one reaction site to another. A micro-directing element can also introduce substrates or reagents to the apparatus from a source, or direct an intermediate or a product to a detector or to a location off the apparatus.

The apparatus can employ active or passive transport mechanisms to move intermediates, products, reagents, solvents, and the like from one site to another. In one embodiment, the micro-directing element is a channel, and a passive transport mechanism employs diffusion, thermal convection, capillary action, and the like. In another embodiment, an active transport mechanism is a device that employs a motive force including pressure, electroosmotic force, piezoelectric force, electrostatic force, centrifugal force, or force generated by centripetal acceleration. In a preferred embodiment, the force used is electroosmotic force.

Optionally, the disclosed apparatus includes a micro-directing element to direct a composition from a source to at least one reaction site. A source can be, for example, a chamber or reservoir containing a substrate composition or another consumable composition needed at a reaction site, such as a solvent, buffer, reagent, etc. The disclosed apparatus can comprise more than one source, each directed to the same reaction site, to different reaction sites or to other useful locations on the apparatus.

The disclosed apparatus often comprises more than two reaction sites, e.g., typically comprising n additional reaction sites, wherein n is an integer from 1 to 50. Typically, each additional reaction site comprises a distinct immobilized biocatalyst. The apparatus additionally comprises micro-directing elements to sequentially direct a composition from the second reaction site to each of the n additional reaction sites. "Sequentially" means that a composition can be directed in a particular and pre-designated order from a first reaction site to the last reaction site through each of the other reaction sites in the pre-designated order. For example, that when there are four distinct reaction sites (i.e., n is 2), a composition can be directed to the first reaction site, then to the second reaction site, then to third reaction site and finally to the fourth reaction site.

In another option, the apparatus additionally comprises at least one reaction site that comprises a catalyst of non-biological origin. For example, a catalyst normally used in a non-biological context, such as a metal oxidation catalyst, can be incorporated into a reaction site.

In still another embodiment, the biocatalyst at the first reaction and the biocatalyst at the second reaction site are each a functional catalytic unit from sequential steps in a natural biosynthetic pathway. A natural biosynthetic pathway is a sequence of reaction steps that a living cell performs to transform a substrate compound into a natural product compound. A functional catalytic unit comprises the biocatalytic components that conduct a reaction step. A functional catalytic unit can be a single enzyme, or an enzyme and its cofactor, or a multi-enzyme complex, and the like. For example, in a simple two-step biosynthetic pathway, a substrate S can be acted on by an enzyme A to produce a first intermediate I. A multi-enzyme complex B can then act upon first intermediate I to produce a second intermediate, or product P. To produce this pathway in the apparatus, enzyme A is immobilized at the first reaction site, and multi-enzyme complex B is immobilized at the second reaction site.

In another embodiment of the apparatus, the biocatalyst at the first reaction site, the second reaction site and each of the n additional reaction sites are a functional catalytic unit from the steps of a natural biosynthetic pathway, and the apparatus additionally comprises micro-directing elements to direct a composition sequentially to each of the reaction sites in the order of the sequence of the catalytic units in the biosynthetic pathway. In this embodiment, the apparatus reproduces an entire biosynthetic pathway. Examples of natural biosynthetic pathways that can be reproduced in the disclosed apparatus include the picromycin polyketide synthase pathway, the erythromycin polyketide synthase pathway, the nonribosomal peptide synthetase pathway, or the β-lactam nonribosomal peptide synthetase pathway.

Optionally, the apparatus includes a device to control the temperature of at least a portion of the apparatus. Such devices can include a heat exchanger, a heating element, a chilled water loop, a refrigeration loop, a heat sink, a thermal gradient maintained between two heat sinks of different temperature, a spot heating method such as an individual heating element, a focused infrared light source, and the like. Temperature affects reaction rates and the stability of substrates, catalysts, biocatalysts, and intermediates. Certain operations on the apparatus can raise the temperature, for example, in some circumstances, employing electroosmotic force can lead to increased temperature. This can be undesirable in some situations so it can be necessary to cool the apparatus. By contrast, it can be advantageous to change the temperature of a reaction site to change a reaction rate. Thus, the same apparatus could optionally include location specific temperature control as well as apparatus-wide temperature control.

Other optional features of the apparatus include a detector and micro-directing elements to direct at a composition from one reaction site to a detector. A detector is a component or series of components that detect properties of a reaction or a reaction product. For example, a mass spectrometer can measure the molecular weight of a chemical compound or a spectrometer could measure the concentration of a compound via absorption. The detector can include an aspiration probe, a laser desorption probe, an ion beam desorption probe, a gas desorption probe, a liquid desorption probe, a contact probe, an optical spectrometer, a microscope, an imager, a mass spectrometer, a chromatography apparatus, an electrochemical detector, a particle detector, a radiation detector, a magnetic resonance spectrometer, or a chemical indicator.

A preferred embodiment of the invention is a microfluidics chip, comprising a solid support comprising a first and second reaction site, wherein the first and second reaction sites each comprise a distinct biocatalyst. Each biocatalyst is a functional catalytic unit of a natural biosynthetic pathway; and each said biocatalyst is immobilized by a polyacrylate substituted with sucrose, lactose, mannose, an alkylmannoside, glucose, an alkylglucoside, galactose, an alkylgalactoside, fructose, an alkylfructoside, or trehalose. The chip uses microfluidics to direct a substrate composition from a source to the first reactive composition, and microfluidics elements to direct an intermediate composition from the first reaction site to the second reaction site, wherein the biocatalysts at the first and second sites are from sequential steps in the natural biosynthetic pathway.

The apparatus can be used in a number of different ways, e.g., to conduct sequential reactions, to mimic portions of a natural biosynthetic pathway, to conduct variations on a natural pathway, to create hybrid elements of natural and unnatural pathways, and to conduct novel pathways.

To conduct the disclosed method using the disclosed apparatus, a substrate is directed to the first reaction site and exposed to conditions suitable for reacting said substrate with said immobilized catalyst, thereby producing a first intermediate composition.

The method further includes directing the first intermediate to the second reaction site, again exposing the second reaction site to conditions suitable for reacting the first intermediate with the immobilized catalyst, thereby producing a second intermediate composition. This process can be repeated for each subsequent reaction site, i.e., the intermediate produced by a reaction site becomes the substrate for a subsequent reaction site. The intermediate produced by the final reaction site in the sequence can then be termed the product of the sequence.

Suitable conditions for reaction include chemical, physical, and biological elements that allow, facilitate, or are necessary for a reaction to take place between a substrate and a catalyst. A chemical element can be a solvent, a buffer, a co-substrate, a consumable chemical reagent, and the like. A physical element can be the temperature, pressure, reaction time, and the like. A physical element can be also be, for example, application of a light source for an enzyme-catalyzed photochemical reaction, or application of an electric potential to assist an oxidation or reduction reaction. A biological element can be, for example, an enzyme cofactor, or a supply of a consumable reagent such as adenosine triphosphate (ATP) or nicotinamide adenine dinucleotide phosphate (NADPH).

By combining the apparatus and methods disclosed herein a variety of different reaction scenarios can be realized. For natural biosynthetic pathways, portions or entire pathways can be reproduced. The elements of natural pathways can be rearranged to produce unnatural sequences. Additional steps can be incorporated, whether duplicated steps form the original pathway, steps from other biosynthetic pathways, or artificial reaction steps that are not part of any natural pathway. In addition, natural pathways can be altered by using unnatural substrates, whether by adding them to the apparatus from a source or by creating unnatural intermediates that result from preceding reactions. Also, an apparatus can consist of biocatalysts where no two biocatalysts originate from the same natural pathway. With every possibility, a substrate is directed to a reaction site, exposed to conditions suitable for reaction with the biocatalyst immobilized at that site, and the resulting intermediate is directed to the next site, where the reaction cycle repeats. Thus, using the same apparatus, numerous different synthetic pathways can be produced. In this manner, large numbers of natural products, variations on natural products, and completely novel products can be synthesized.

Another option in the method of the invention is detecting a constituent of a composition, e.g., an end product, an intermediate, an unwanted intermediate, unreacted substrate, byproducts, consumable reagents, and the like. The step of detecting employs an aspiration probe, a laser desorption probe, an ion beam desorption probe, a gas desorption probe, a liquid desorption probe, a contact probe, an optical spectrometer, a microscope, an imager, a mass spectrometer, a chromatography apparatus, an electrochemical detector, a particle detector, a radiation detector or a magnetic resonance spectrometer.

Another embodiment of the invention is a method for conducting sequential reactions, comprising the steps of providing a microfluidics chip, where the chip comprises a first reaction site and a second reaction site. Each reaction site comprises an immobilized biocatalyst, wherein each catalyst is a catalytic antibody, an enzyme, an enzyme domain, a multi-enzyme complex, a catalytic peptide or a catalytic RNA molecule. Each said immobilized catalyst is immobilized by a material comprising a polyacrylate substituted with sucrose, lactose, mannose, glucose, an alkylmannoside, an alkylglucoside, galactose, an alkylgalactoside, fructose, an alkylfructoside, or trehalose. Using this apparatus, the method comprises the steps of directing (preferably by microfluidics) a substrate composition to the first reaction site under conditions suitable for reacting said substrate with said biocatalyst, thereby producing a first intermediate composition. Another step includes directing said first intermediate to the second reaction site under conditions suitable for reacting said intermediate with said biocatalyst, thereby producing a second intermediate composition.

EXEMPLIFICATION

The present invention is illustrated by the following examples, which are not intended to be limiting in any way.

EXAMPLE 1

Enzymatic Polyphenol Synthesis on a Microfluidics Chip

A simple T-shaped microfluidic biochip was fabricated using standard photolithographic techniques and wet etching. The reservoirs had a volume of 3 µL and the main channel length was 30 mm with a width of 176 micrometers and a depth of 15 micrometers to give a channel volume of 80 nanoliters. Stable bonding of the cover slide, which is necessary to allow flow to occur in channels and avoid leakage, was done at 595° C. with optimized heating and cooling rates. Fluid transport in the channels was carried out electroosmotically after hydrolyzing the silanol groups on the channel wall using 1N NaOH.

Calcein blue was used as a fluorescent dye to visualize fluid flow using a CCD camera. A similar microfluidic system was used to demonstrate enzyme-catalyzed polymer synthesis. Specifically, soybean peroxidase and p-cresol (from one reservoir) were mixed with $H_2O_2$ (from a second reservoir) and the mixture was directed through the channel using voltages ranging from 500-2000 V. Other conditions include 100 µg/ml SBP (enzyme reservoir); 10 mM p-cresol (substrate reservoir), 0.4 mM $H_2O_2$ (consumable reagent reservoir), pH 5 aqueous buffer containing 30% (v/v) DMF. The T junction aided in the mixing of the reactant streams. The increase in product is constant and enables us to calculate a conversion of ~50% (within the microchannel) based on the limiting substrate, $H_2O_2$. Analysis was performed by removing a 2 µL aliquot from the receiving well, diluting 10×, and measuring fluorescence in a plate reader in 384-well plates. In addition top-cresol, we used other para substituted phenols in this microfluidic bioreactor, including methoxyphenol, phenylphenol, and hydroxyphenyl acetic acid.

EXAMPLE 2

Methymycin Synthesis on a Microfluidics Chip

The microfluidic chip design in Example 1 was used to perform the PikC-catalyzed hydroxylation of YC-17 to methymycin (Scheme 1). The macrolide substrate (YC-17) and PikC (from one reservoir) was mixed with spinach-ferredoxin $NADP^+$-reductase, ferredoxin, and NADPH (from the second reservoir) and the hydroxylation reaction was allowed to take place down the microchannel using electroosmotic flow conditions as described for polyphenol synthesis in Example 1. Conversions of ca. 75% (using conditions summarized in FIG. 2) were achieved, thereby demonstrating that one of the key enzymatic steps of the polyketide synthesis pathway can be performed on the microscale.

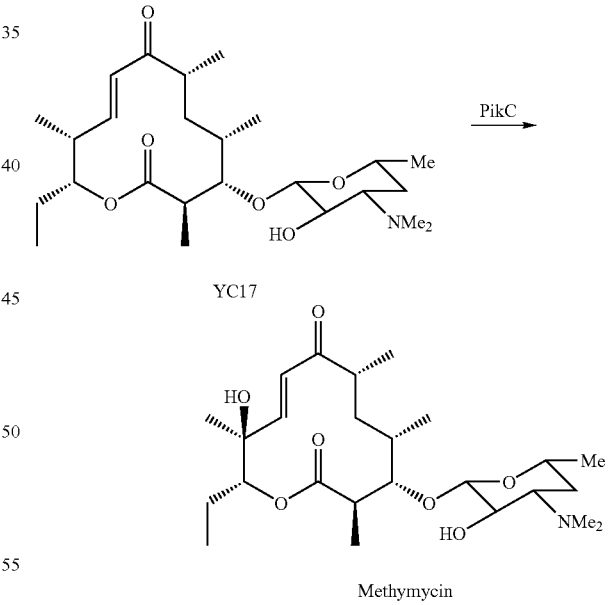

Scheme 1. The enzyme catalyzed reaction described in Example 2. Hydroxylation of YC-17 (0.5 mM) to methymycin catalyzed by PikC hydroxylase (1 µM) in the presence of spinach ferredoxin-$NADP^+$ reductase (0.1 U), ferredoxin (3.5 µM), and NADPH (1 mM)

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for conducting a plurality of microscale reactions, comprising
   a. a solid support comprising a first and a second reaction site, wherein each site comprises a distinct immobilized biocatalyst;
   b. a micro-directing element to direct an intermediate composition from the first site to the second site, wherein the biocatalyst at the first reaction site and the biocatalyst at the second reaction site are each a functional catalytic unit from sequential steps in a natural biosynthetic pathway, the apparatus further comprising a micro-directing element to direct a composition from a source to at least one said reaction site, and
wherein
   1) the apparatus comprises n additional reaction sites;
   2) n is an integer from 1 to 50;
   3) each reaction site comprises a distinct immobilized biocatalyst; and
   4) the apparatus additionally comprises one or more micro-directing elements to sequentially direct a composition from the second reaction site to each of the n additional reaction sites.

2. The apparatus of claim 1, wherein each said biocatalyst is a catalytic antibody, an enzyme, an enzyme domain, a multi-enzyme complex, a catalytic peptide or a catalytic RNA molecule.

3. The apparatus of claim 1, wherein the apparatus additionally comprises at least one reaction site which comprises a catalyst of non-biological origin.

4. The apparatus of claim 1, wherein:
   a. the biocatalysts at the first reaction site, the second reaction site and each of the n additional reaction sites are each a functional catalytic unit from the steps of a natural biosynthetic pathway; and
   b. the apparatus additionally comprises one or more micro-directing elements to direct a composition sequentially to each of the reaction sites in the order of the sequence of the catalytic units in the biosynthetic pathway.

5. The apparatus of claim 4, wherein said biosynthetic pathway is the picromycin polyketide synthase pathway, the erythromycin polyketide synthase pathway, the nonribosomal peptide synthetase pathway, or the β-lactam nonribosomal peptide synthetase pathway.

6. The apparatus of claim 1, wherein each biocatalyst is immobilized by a material comprising a polyacrylamide, a polyacrylate, a sugar-substituted polyacrylate, a polyvinyl alcohol, a polyvinylene, or a polyvinyl silicate.

7. The apparatus of claim 6, wherein each said material comprises a polyacrylate substituted with sucrose, lactose, mannose, an alkylmannoside, glucose, an alkylglucoside, galactose, an alkylgalactoside, fructose, an alkylfructoside, or trehalose.

8. The apparatus of claim 7, wherein said micro-directing elements comprise a channel or a conduit between each reaction site in the sequence.

9. The apparatus of claim 8, additionally comprising a device to propel a fluid between the reaction sites using electroosmotic force.

10. The apparatus of claim 9, further comprising a device to control the temperature of at least a portion of the apparatus.

11. The apparatus of claim 10, further comprising a micro-directing element to direct at least one said intermediate composition from one said reaction site to a detector.

12. The apparatus of claim 11, further comprising a detector, wherein said detector comprises an aspiration probe, a laser desorption probe, an ion beam desorption probe, a gas desorption probe, a liquid desorption probe, a contact probe, an optical spectrometer, a microscope, an imager, a mass spectrometer, a chromatography apparatus, an electrochemical detector, a particle detector, a radiation detector or a magnetic resonance spectrometer.

13. A microfluidics chip, comprising
   a. a solid support comprising a first and second reaction site, wherein
      i. the first and second reaction sites each comprise a distinct biocatalyst that is a functional catalytic unit of a natural biosynthetic pathway;
      ii. each said biocatalyst is immobilized by a polyacrylate substituted with sucrose, lactose, mannose, an alkylmannoside, glucose, an alkylglucoside, galactose, an alkylgalactoside, fructose, an alkylfructoside, or trehalose;
   b. microfluidics elements to direct a substrate composition from a source to the first reactive composition, and microfluidics elements to direct an intermediate composition from the first reaction site to the second reaction site, wherein the biocatalysts at the first and second sites are from sequential steps in the natural biosynthetic pathway.

* * * * *